March 30, 1943.   J. F. KANE   2,315,059
LOCKING ARRANGEMENT IN SECURING SKID CHAINS TO WHEELS
Filed April 12, 1940   2 Sheets-Sheet 1
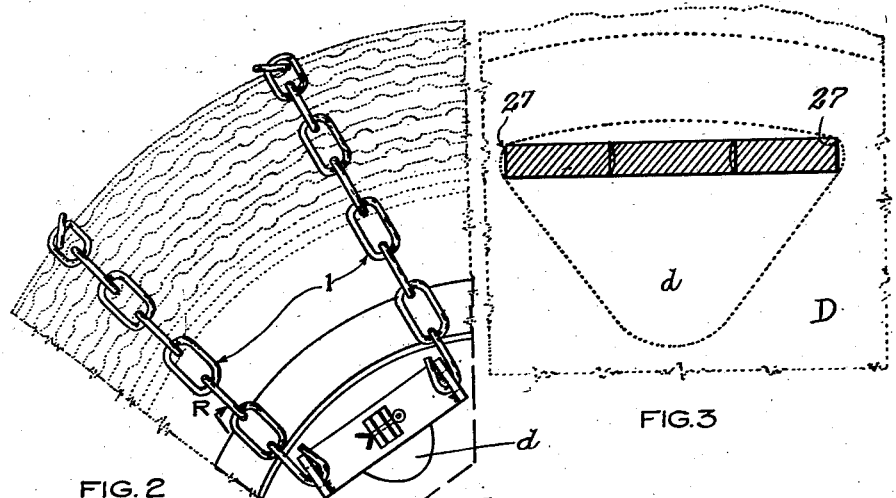
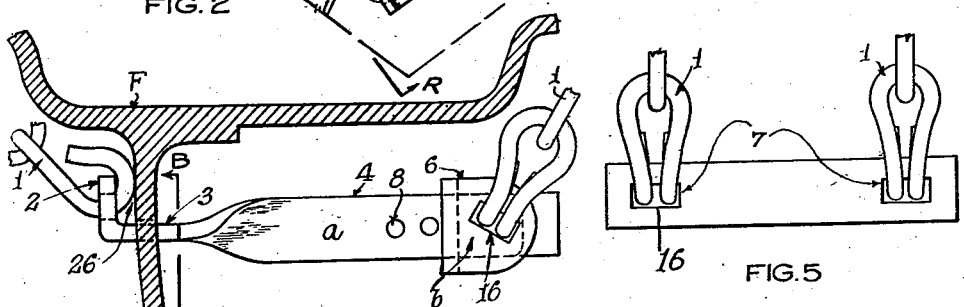
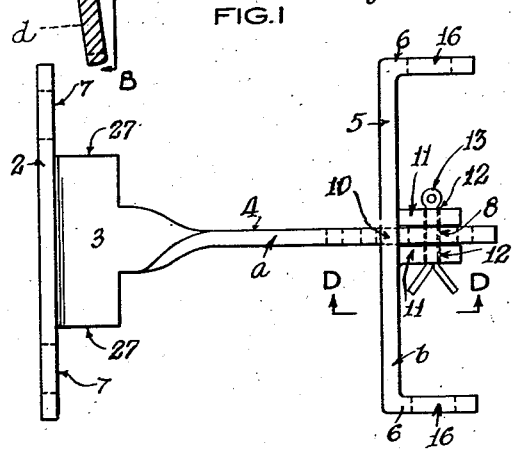
INVENTOR
John F. Kane March 30, 1943.   J. F. KANE   2,315,059
LOCKING ARRANGEMENT IN SECURING SKID CHAINS TO WHEELS
Filed April 12, 1940   2 Sheets-Sheet 2

INVENTOR
John F. Kane.

Patented Mar. 30, 1943

2,315,059

UNITED STATES PATENT OFFICE 2,315,059

LOCKING ARRANGEMENT IN SECURING SKID CHAINS TO WHEELS

John F. Kane, Fall River, Mass., assignor to James T. Kane and himself, Fall River, and James H. Kane, Boston, Mass., copartners doing business under the firm name of Kane Chain Company, Fall River, Mass.

Application April 12, 1940, Serial No. 329,336

7 Claims. (Cl. 152—237)

My invention relates to an improvement in the manner in which traction cross chains of the emergency type are fastened to a disc wheel, and is particularly adapted for use on wheels of trucks, buses and other like vehicles.

An important object of my invention is to provide a locking device for fastening traction cross chains to a disc wheel, of such a character that it can be easily and quickly attached, without moving the wheel either along or off the ground.

Another object of the invention is to lock to the wheel both laterally and radially the fastening part of the unit, while allowing a slight creep in the traction cross chains back and forth along the tire.

A further object is to provide an adjustable means for fastening the ends of the unit together, with the fastener in its position locked to the wheel and so constructed that it can be easily secured to the wheel and adjusted to fit different sized tires.

These and further objects and advantages of my invention will more fully appear from the following description, it being understood that various changes may be made in the form, details, proportion and arrangement of the various parts without departing from the scope of my invention.

In the drawings:

Figure 1 is a detail of section R—R shown in Figure 2, and is taken through part of a wheel disc and rim, showing one species of the chain assembly in position on the wheel, the outside of the wheel being shown on the right hand side of the figure.

Figure 2 is a front elevational view, showing the outside of a wheel and tire, and illustrates the manner in which the traction cross chains combine with one species of the fastening part of the assembly.

Figure 3 is a detail view of the lock formed by the locking member acting in conjunction with the walls of a wheel disc opening, and is section B—B in Figure 1.

Figure 4 is a plan view, showing one species of the locking and receiving members fastened together.

Figure 5 is a rear view of part of one species of the locking member which is applied against the inside of the wheel, as disclosed in Figure 1.

Figure 6, which is a sectional view through the receiving member and is section D—D in Figure 4, shows the connection between the locking and receiving members in one species of unit.

Figure 7:
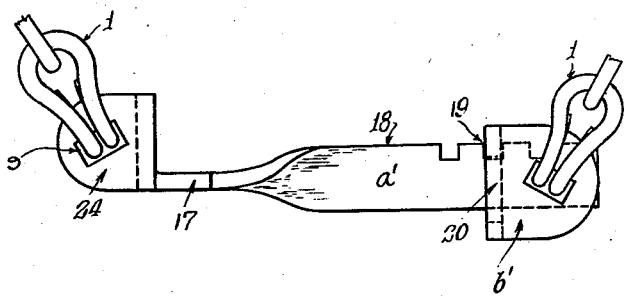

Figure 7 is a view in side elevation, showing another species of locking and receiving members fastened together, the right hand part of the figure being on the outside of the wheel.

Figure 8:
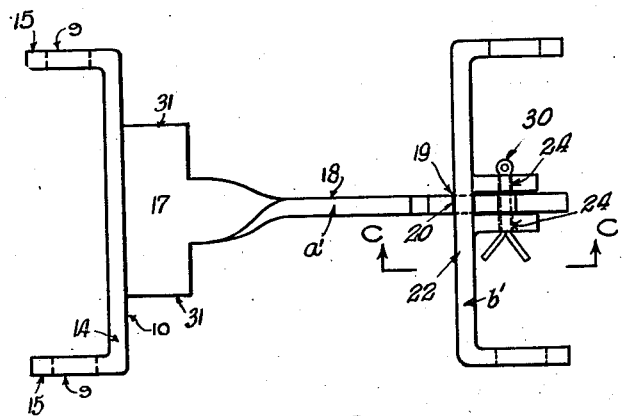

Figure 8 is a plan view thereof.

Figure 9:
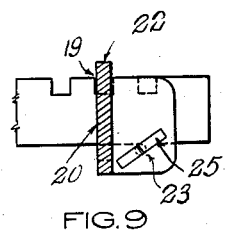

Figure 9 is section C—C in Figure 8, taken through the receiving member showing the connection between the locking and receiving members in another species of unit.

Figure 10:
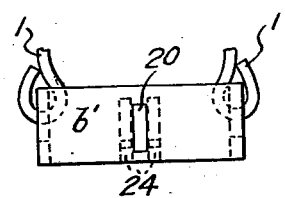

Figure 10 is a front elevational view of the receiving member.

The two species of the locking member as a unit will be denoted by $a$ and $a^1$.

The two species of the receiving member as a unit will be denoted by $b$ and $b^1$.

In Figure 1, F denotes a wheel rim.

In Figure 3, D denotes a wheel disc with opening $d$.

Referring to the drawings by numerals, numeral 1 refers to a pair of traction cross chains in position on a tire. The ends of these cross chains on the inside of the tire are connected to the vertical leg of a locking member $a$.

There are two species of locking members, the first consisting of a vertical leg 2, with openings near each end 7 for receiving the inner ends of the cross chains 1, and from this vertical leg projects a horizontal flange extension 3 with opposite rectilinear sides 27, from which flange extension a vertical elongated tongue 4 projects, which tongue contains a number of equally spaced circular openings 8.

The ends of the cross chains 1 on the outside of the tire are connected to a receiving member $b$.

This receiving member consists of a vertical leg 5, with its ends 6 bent outwardly, each end containing an opening 16 for receiving the outer ends of the cross chains 1, with an opening 10 in the center of the vertical leg through which the elongated tongue 4 of the locking member is inserted.

Extending outwardly from this vertical leg, upon opposite sides of this center opening, are two vertical outstanding ears 11 each containing an opening 12.

A pin, 13 passing through the openings in these outstanding ears and the coinciding opening 8 in the elongated tongue, fastens the ends of the assembly together.

The second species of locking member $a^1$, as disclosed in Figures 7, 8 and 9, consists of a vertical leg 14 with its ends 15 bent outwardly, each containing an opening 9 for receiving the ends of the cross chains, and from this vertical leg projects a horizontal flange extension 17 with opposite rectilinear sides 31, from which flange extension a vertical elongated tongue 18 projects, which tongue contains a number of equally spaced rectangular openings 19 along its edge, in the form of teeth.

The receiving member $b^1$ in this species is similar in construction to that shown in Figure 4 and consists of a vertical leg with its ends bent outwardly, differing mainly in the position of the opening for the fastening means.

Describing the manner in which the assembly is attached to a wheel, the end containing the locking member $a$ or $a^1$ is placed in position on the inside of the tire, and the elongated tongue and flange extension (either 3 and 4, Figure 4, or 17 and 18, Figure 8) on said locking member are inserted through one of the openings in the wheel disc $d$ just below the rim, as disclosed in section in Figure 3.

When the first species of locking member is used, it is manually pulled into position from the outside with the ends of the chains 1 bearing against the inner face of the disc 26 and the opposite rectilinear sides 27 of the flange extension engaging the walls of the disc opening (see 27—27, Figs. 3 and 4), resulting in a lock being formed between this member and the wheel.

The end of the assembly containing the receiving member $b$ (Fig. 4) is placed in position around the front of the tire, with this member in position under the rim to engage the locking member.

The elongated tongue 4 of the locking member is inserted through the center opening 10 in the receiving member, and when the cross chains are snugly in position encircling the tire, a pin 13 is inserted through the coinciding openings 12 and 8 in the vertical outstanding ears of the receiving member and the elongated tongue of the receiving member, thus fastening the assembly together.

When the second species of locking member $a^1$ (disclosed in Figures 7, 8 and 9) is used, upon its being manually pulled into position through the disc opening $d$ from the outside, the vertical leg 14 (Fig. 8) of this member bears directly against the inner face of the disc 26, thus holding the locking member more securely in position radially than results when using the first species of locking member.

The opposite rectilinear sides 31 of the flange extension 17 engage the walls of the disc opening $d$ resulting in a lock between this member and the wheel (as disclosed previously in Fig. 3).

The receiving member $b^1$ is placed in position on the outside of the wheel under the rim, and the elongated tongue 18 is inserted through the center opening 20 in the receiving member, and when the cross chains are snugly in position encircling the tire, the elongated tongue is moved upward with the faces of one of the teeth 19 engaging the walls of the vertical leg 22 of the receiving member, above the center opening 20, (see Fig. 9). A pin 23 is then inserted through the openings in the outstanding ears 24 of the receiving member and passing under the bottom face of the elongated tongue 25, prevents said tongue from dropping out of its fastening with the receiving member.

I claim:

1. In combination with a skid chain assembly for a disc wheel with spaced circumferential openings; a locking member comprising a flange extension having opposite parallel sides shaped to snugly fit said disc opening upon insertion therein, with a projecting vertical leg fastened to the inner end of said chain assembly and an elongated tongue with spaced openings, a receiving member comprising a vertical leg extending outwardly at its ends for fastening to the outer end of said chain assembly, oppositely spaced outstanding ears bounding a central aperture for receiving said elongated tongue and a fastening means inserted through said ears and tongue for adjustably engaging and holding said tongue in adjusted position.

2. In combination with a skid chain assembly for a disc wheel with spaced circumferential openings, a locking means on one end thereof, comprising a flange extension with opposite rectilinear sides shaped to fit tightly against the walls of said disc opening upon insertion therein, and an elongated tongue, a receiving means fastened to the other end of said chain assembly, comprising a member with oppositely spaced outstanding ears bounding a central aperture for receiving said tongue and a fastening means inserted through said ears and tongue for adjustably engaging and holding said tongue in adjusted position.

3. In combination with a skid chain assembly for a disc wheel with spaced circumferential openings, a locking member comprising a flange extension with opposite rectilinear sides shaped to engage in close contact the walls of said opening upon insertion therein, a vertical leg positioned to bear against the inner face of said disc with its ends bent outwardly for fastening to said chain assembly and an elongated tongue with spaced openings, a receiving member fastened at its projecting ends to the other end of said chain assembly, with oppositely spaced outstanding ears bounding a central aperture for receiving said tongue and a fastening means inserted through said ears and tongue for adjustably engaging and holding said tongue in adjusted position.

4. In combination with a skid chain assembly for a disc wheel with spaced circumferential openings, a locking means on one end thereof comprising a flange extension with opposite rectilinear sides shaped to snugly fit said disc opening upon insertion therein and an elongated tongue with spaced openings, a receiving member fastened to the other end of said chain assembly with a central aperture for receiving said tongue bounded by oppositely spaced outstanding ears and a fastening means inserted through said ears and tongue for adjustably engaging and holding said tongue in adjusted position.

5. In a device of the charatcer described, the combination with a tire and a disc wheel of a skid chain assembly, comprising cross chains, a locking member with a flange extension having opposite rectilinear sides shaped to snugly fit into and engage the walls of a circumferential disc opening adjacent the rim upon insertion therein, a vertical leg positioned to bear against the inner face of said disc and an elongated tongue indented along its edge, a receiving member comprising a vertical leg, oppositely spaced outstanding ears bounding a central aperture for receiving and adjustably engaging said elongated tongue and a fastening means inserted through said ears and below said tongue, holding the assembly in adjusted position.

5. In a device of the character described, the having spaced circumferential openings and a skid chain assembly, comprising cross chains fastened at their inner ends to the projecting ends on a vertical upstanding element of a locking member and positioned to bear against the inner surface of said disc, said locking member including a horizontal flange extension with opposite rectilinear sides shaped to engage the walls of said circumferential disc opening upon insertion therein and a vertical elongated tongue with spaced openings, a receiving member consisting of a vertical leg with projecting ends for fastening to the outer ends of said cross chains, oppositely spaced outstanding apertured ears bounding a central aperture in said leg for receiving said elongated tongue and a fastening member inserted through said ears and the coinciding opening in said tongue for adjustably engaging and holding said assembly in adjusted position.

7. The combination of a tire on a disc wheel having spaced circumferential openings and a skid chain assembly, comprising cross chains fastened at their inner ends to projecting flanges on a vertical upstanding element of a locking member, with said vertical element positioned to bear against the inner surface of said disc, said locking member including a horizontal flange extension with opposite rectilinear sides shaped to engage the walls of said circumferential disc opening upon insertion therein and a vertical elongated tongue with spaced indentations along its edge, a reeciving member consisting of a vertical leg with projecting ends for fastening to the outer ends of said cross chains, oppositely spaced outstanding apertured ears bounding a central aperture in said leg for receiving and adjustably engaging said elongated tongue at an indentation and a fastening member inserted through said ears and below said tongue for holding said assembly in adjusted position.

JOHN F. KANE.